United States Patent [19]

Rossi et al.

[11] 4,217,617
[45] Aug. 12, 1980

[54] TURBINE TRIP CIRCUIT

[75] Inventors: Anthony J. Rossi, Fitchburg; Richard E. Lundberg, Ashby; Thomas A. Fancy, Westminster; Donald F. Behringer, Ashburnham; John B. Haven, Lunenburg, all of Mass.

[73] Assignee: General Electric Company, Schenectady, N.Y.

[21] Appl. No.: 944,761

[22] Filed: Sep. 22, 1978

[51] Int. Cl.² .............................................. H02H 7/06
[52] U.S. Cl. ..................................... 361/51; 361/236; 290/40 A
[58] Field of Search ................. 361/51, 236, 239, 240, 361/242; 290/40 A, 40 R; 123/102

[56] References Cited

U.S. PATENT DOCUMENTS

| | | |
|---|---|---|
| 3,274,443 | 9/1966 | Eggenberger et al. .......... 361/239 X |
| 3,829,232 | 8/1974 | Fieglein et al. ............... 290/40 A X |
| 3,882,361 | 5/1975 | Hinman, Jr. et al. ................... 361/85 |
| 4,016,723 | 4/1977 | Farley .............................. 361/239 X |
| 4,071,897 | 1/1978 | Groves, Jr. et al. . |

*Primary Examiner*—Patrick R. Salce
*Attorney, Agent, or Firm*—James W. Mitchell; John F. Ahern

[57] ABSTRACT

The disclosure sets forth trip circuitry for a rotating shaft machine which includes redundant overspeed protection and means for testing the overspeed protection circuit while the machine remains in operation. Moreover, further protective circuitry is provided for detecting a failure in the speed sensing system. The overspeed protection and the speed sensing failure circuit are each connected to a relay system which may actuate a trip servo valve to a closed position.

1 Claim, 1 Drawing Figure

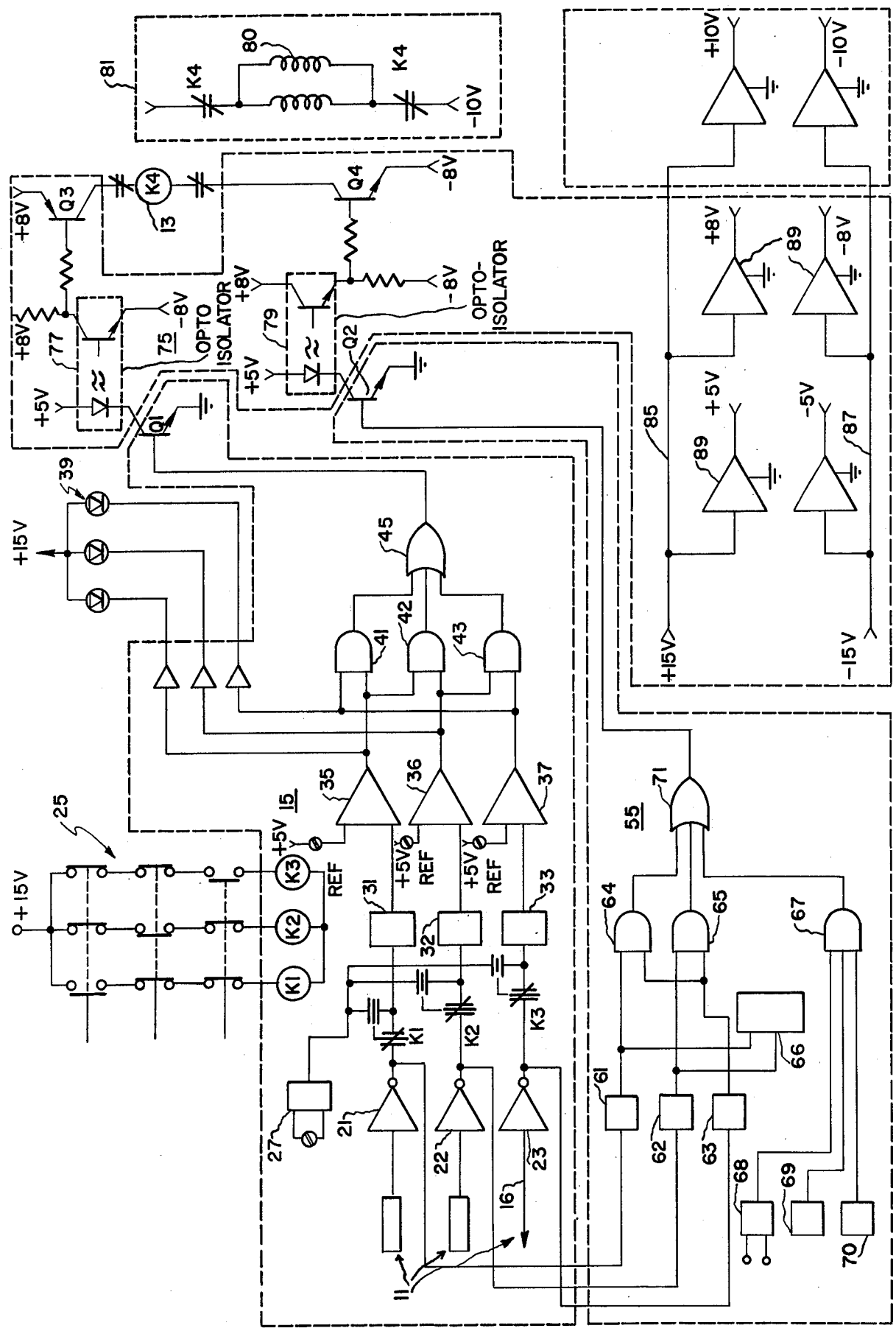

TURBINE TRIP CIRCUIT

BACKGROUND OF THE INVENTION

The invention relates, in general, to the control of large rotating shaft machinery and, in particular, relates to a testable, redundant trip circuit for a turbomachine.

In a turbomachine, electronic speed control is provided on two levels; namely, speed control based on normal operating conditions wherein control valves are positioned in accordance with a comparison between a desired speed and an actual speed and the range of control is normally from 0–100 percent of rated speed. In response to a valve position change command, the turbine valve may be adjusted to a more open or more closed position. On the other hand, a second speed control relates to overspeed protection which pertains at speed in excess of rated speed and which, when reached, will cause a turbomachine to trip based on the rapid shutting down of motive fluid to the turbomachine. Overspeed protection is usually provided in the form of a solenoid valve between the source of motive fluid and the turbine which is normally full open during normal operating conditions and which will fully close in response to a signal from an overspeed trip circuit. It is this latter type of speed control to which this invention is directed.

Some turbomachines are used in support of other operations such as boiler feed pump turbines, industrial drive turbines and plant process turbines. The underlying common concern regarding these types of support turbines is that a shutdown of the turbine due to an overspeed condition or turbine control failure may cause a chain of shutdown events which can be very costly to the turbine owner.

Reliability can be expressed in two ways; namely, the ability to trip the turbomachine when an overspeed condition arises; and, the ability not to trip the turbomachine unless an overspeed condition arises.

OBJECTS OF THE INVENTION

It is one object of the present invention to provide a more reliable overspeed protection circuit than has been heretofore available to turbine owners.

It is desirable to provide a means for allowing on line testing of protective circuitry and this then has become another object of the invention.

Another further object is to provide redundant logic circuitry in combination with discriminating logic circuitry in order to avoid unnecessary turbine shutdown.

One of the features of the discriminating logic is the ability to detect failures in the shaft speed pickup. A corollary requirement is that means must be required to offset zero speed detection during startup of the turbomachine. This is therefore become another object of the invention.

The novel features believed characteristic of the present invention are set forth in the appended claims. The invention itself, however together with further objects and advantages thereof may be best understood with reference to the following detailed description and examples.

BRIEF DESCRIPTION OF THE DRAWINGS

The sole drawing is a schematic circuit model of the present invention without showing the turbomachine or servo valve in detail.

DETAILED DESCRIPTION OF THE INVENTION

Numerous examples relating to overspeed control of a prime mover are available in the prior art including U.S. Pat. Nos. 3,986,364 and 3,614,457. Briefly, the concept of overspeed trip includes a drastic halt of motive fluid into the prime mover at some preselected rotor speed usually in excess of rated speed. One type of servo valve which may be used to shut down the flow of motive fluid in response to an overspeed signal is shown in U.S. Pat. No. 3,495,501. Another type of trip valve is shown in U.S. Pat. No. 3,785,615. The foregoing patents are illustrative of the environment in which the present invention may be applied and are incorporated herein for illustration and should not be deemed as limiting features.

The drawing is a schematic of an electronic circuit which includes multiple speed inputs 11 at its input end and terminates at an output end in a trip relay 13. Each dashed border line represents a circuit board configuration organized in convenient functional division. One circuit is the overspeed detection circuit 15.

The overspeed detection circuit receives the multiple signal inputs 11. The signal inputs may come from speed pickups adjacent the prime mover or turbomachine shaft (not shown). One of the speed inputs may come from a redundant speed input 16, the details of which are fully explained in U.S. Patent application Ser. No. 854,973 filed Nov. 25, 1977 for Thomas A. Fancy and assigned to the assignee of the present invention. Each signal input may be conditioned in a Schmitt Trigger circuit 21, 22 and 23, respectively. Switches K-1, K-2, and K-3 are associated with relays K-1, K-2, and K-3 which are part of a test circuit 25. The test circuit shown may be used to introduce a variable pulse train into the overspeed detection circuit one channel at a time, in order to test the functioning of each channel. The variable pulse train is initiated in a variable frequency oscillator 27 and introduced into a selected channel through a closed switch corresponding to a test circuit selection.

Each channel signal, be it a test or measured signal, is then input into a respective frequency-to-voltage converter 31, 32 or 33 so that each output is at a voltage level corresponding to shaft speed or as in the case during test, the test signal. Overspeed detection is accomplished by means of comparators 35, 36 and 37 respectively which compare a reference voltage with the speed channel voltage. If the channel voltage exceeds the reference voltage, the comparator output goes low and causes the lighting of an LED for the appropriate channel on the indicator panel 39. The reference voltage is adjustable by means of a pot as shown.

The output of each comparator is also input into at least "two out of three" AND gates 41, 42 and 43. This simply means that in order to report an overspeed signal at least two signals or speed inputs must report an overspeed condition through their respective comparators. This logic circuitry also allows circuitry tests, one channel at a time, since two overspeed reports are required for trip. The AND gate outputs are gathered at an OR gate 45 whereupon if two out of three comparators go low, three out of three AND gates will be low and the resultant output of the OR gate 45 will also be low. A low output from the OR gate 45 is a first trip signal based upon overspeed.

In accordance with the philosophy of the invention the user of the present invention is also protected against shaft pickup failure. The shaft pickups operate in a hostile environment of heat and oil so that failure of a pickup is always possible. For this reason redundant pickups are employed. Referring to a pickup failure board 55 there are three signal inputs which are picked off from the signal inputs into the board 15. These signal inputs are fed into respective retriggerable multivibrator circuits 61, 62 and 63. The nature of each multivibrator circuit is such that it will output a low signal whenever the time interval between input pulses exceeds a preset time interval in the multivibrator circuit If the shaft pickup fails its pulse output will cease and hence there will be a low multivibrator output. An annunciator panel 66 is used to monitor the isolated pickup inputs.

The output of each isolated pickup is input into either AND gate 64 or 65. The output from the redundant pickup 16 is input into both AND gates on the assumption that redundancy is already built into that channel. Should either of the isolated pickups fail, the output of the respective AND gates would go low. As part of the circuitry of the pickup failure board means are provided for temporarily overriding the failure board as, for example, during startup. This startup trip interlock logic includes an AND gate 67 which receives three inputs; namely, a timed input 68, a "0" RPM input 69 and a shaft speed input 70. This circuitry is provided to allow the turbine to be started from standstill. This is accomplished by sensing that the turbine is at zero speed and initiating an overriding time dependent signal when both the trip throttle valve and control valve move off their closed positions. The duration of the overriding signal is approximately one rotor time constant but is terminated once the turbine speed is sensed.

The output signals from AND gates 64, 65 and 67 are input into an OR gate 71. If all three inputs go low indicating that the turbine is not on startup and that at least two out of three are failed then a (low) trip signal will be output from OR gate 71. In summary, there are two trip signal outputs. One trip signal indicates overspeed whereas the second trip signal indicates "pickup" failure. Both signals are self-validating in that a multiple event or failure is necessary for triggering an alarm.

A third circuit board is the trip circuit board 75 which includes a pair of opto-isolator relays 77 and 79 connected to the outputs of OR gates 45 and 71 respectively. In the normal operating mode of the circuit described, the Trip Relay K4 (13) is energized. Opto-isolator transistors $Q_1$ and $Q_2$ are turned on by a high input at each transistor base. This causes a current flow through the Trip Relay K4 as transistors $Q_3$ and $Q_4$ are also turned on. If current is removed from the base of transistors $Q_1$ and $Q_2$ because of a low output from either OR gate 45 or 71 the Trip Relay will de-energize and the coil 80 of the trip servo valve 81 will also de-energize causing a valve trip or closing.

Power for the components described herein is derived from positive and negative 15 volt buses 85 and 87 which are connected to a number of voltage regulators 89. The voltage regulators will output rated voltage even though the power supply voltage faulters to a level nearing one-half of its stated voltage level. This obviates inadvertent trip due to power supply fluctuation.

The operation of the present invention may be briefly described as follows. The overspeed trip circuit utilizes three speed signal inputs. These signals are TTL compatible pulse trains which are converted to DC voltage levels. The voltage levels are compared to a reference and the output provides a TTL high or low depending on the signal level with respect to the comparator reference level. An "AND/OR" TTL circuit is wired so that two out of three or three out of three speed signal inputs indicating an overspeed condition will de-energize a relay and trip the turbine. A test circuit permits one channel at a time to be checked for proper operating condition.

The shaft speed pickup failure trip circuit also utilizes three speed signal inputs. One of these inputs is the redundant speed signal. The speed signals each drive a retriggerable monostable multivibrator to its high state. The retriggerable remains in the high state as long as the speed pulses are present. The low state only occurs at extremely slow speeds (less than 2 RPM) or at standstill.

The output of the retriggerables are connected to an "AND/OR" TTL circuit that provides the logic to de-energize a trip relay when the redundant speed signal is lost or if the isolated speed pickups are lost. Circuitry is also provided to allow the turbine to be started from standstill. This is accomplished by sensing that the turbine is at zero speed and initiating an overriding time dependent signal when both the trip throttle valve and control valve move off their closed positions. The duration of the overriding signal is approximately one rotor time constant but is terminated once turbine speed is sensed.

Both the overspeed trip circuit and the shaft speed pickup failure trip circuit are powered from a circuit configuration that will prevent a trip from occurring when the primary power source drops to approximately one-half its normal level for short time periods.

While there has been shown what is considered to be the preferred embodiment of the present invention, other modifications may occur to those skilled in the art; and it is intended to cover in the appended claims all such modifications as fall within the true spirit and scope of the invention.

What is claimed is:

1. A trip circuit for a rotating shaft prime mover wherein the input of energy into the prime mover may be controlled by a relay operated normally open fast closing valve, said trip circuit comprising:

multiple shaft speed signal inputs including at least three signal inputs indicative of shaft speed; one of said three signal inputs being redundant to itself;

means for detecting an overspeed condition in said prime mover from said shaft speed signal inputs;

means for detecting a failure in said shaft speed signal inputs including retriggerable monostable multivibrators each receiving a shaft speed input whereupon the output of the multivibrator will go low if the shaft speed input falls below a preselected level;

AND gates connected to the multivibrator outputs whereupon a failure and two speed inputs or in the redundant speed input will cause a low output signal;

an OR gate receiving the outputs from the AND gates;

a startup trip interlock logic comprising a start-override time delay; a zero revolution sensing logic; and, a speed sensing circuit, all three outputs being input into an AND gate connected to the failure circuit OR gate whereby during startup of the prime mover a mock signal is input into the OR gate for the delay time or until the prime mover is at a predetermined shaft speed;
a first switch connected at the output end of said overspeed detecting means; and,
a second switch connected at the output end of said speed input failure detecting means; said control relay interconnected between said first and second switches whereby a trip in the prime mover may be initiated by either an overspeed or speed input failure signal.

* * * * *